(12) United States Patent
Goto et al.

(10) Patent No.: US 7,401,364 B2
(45) Date of Patent: Jul. 22, 2008

(54) VEHICLE AIRBAG APPARATUS

(75) Inventors: Hiroshi Goto, Wako (JP); Satoshi Iijima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 11/270,758

(22) Filed: Nov. 9, 2005

(65) Prior Publication Data
US 2006/0125206 A1   Jun. 15, 2006

(30) Foreign Application Priority Data
Dec. 10, 2004   (JP)   ............... 2004-357740

(51) Int. Cl.
*A41D 13/00* (2006.01)
(52) U.S. Cl. .......................... 2/102; 2/DIG. 3
(58) Field of Classification Search ............ 2/102, 2/455, 456, 463–465, 467, 411, 413, DIG. 3, 2/462, 69
See application file for complete search history.

(56) References Cited

U.S. PATENT DOCUMENTS 4,825,469 A  *  5/1989  Kincheloe .............. 2/456
6,032,299 A  *  3/2000  Welsh .................... 2/456
6,125,478 A  * 10/2000  Alaloof .................. 2/456
6,766,535 B2 *  7/2004  Duhamell et al. ....... 2/102

FOREIGN PATENT DOCUMENTS

JP   9-66789   3/1997

* cited by examiner

*Primary Examiner*—Tejash Patel
(74) *Attorney, Agent, or Firm*—Hamre, Schumann, Mueller & Larson, P.C.

(57) ABSTRACT

A wearing type airbag apparatus that is worn by a passenger in advance of a collision, wherein the passenger is not prevented from normal movement during normal travel of a vehicle. Upon the vehicle having a collision, an airbag body is immediately inflated and deployed so that an impact against the passenger is effectively and adequately absorbed. The airbag body and an inflator are provided on a wearing member. An ELR device is provided on a vehicle body, a connecting cable drawn therefrom. The connecting cable is connected to the inflator by an activation switch, so that when a tensile strength of a predetermined value or higher is exerted to the connecting cable, the activation switch is activated to inflate and deploy the airbag body.

3 Claims, 3 Drawing Sheets

VEHICLE AIRBAG APPARATUS

FIELD

The present invention relates to a vehicle airbag apparatus that is put on a passenger's body, in advance of a collision, for absorbing an impact against the passenger.

BACKGROUND

In a vehicle such as a motorcycle, an airbag apparatus is known which is configured in such a manner where a passenger puts on a wearing member having an airbag body and an inflator. A belt to be connected to the inflator is connected to a vehicle body via detachable fixing members provided with sensors. When the motorcycle has a collision and the passenger comes apart from the vehicle body, connection of the fixing members are forcedly released, and sensors sense and react to activate the inflator, whereby the airbag body is inflated and deployed to absorb an impact against the passenger (see, for example, Patent Document JP-A-9-66789).

However, in the airbag apparatus known in the art, in a normal operating state of the vehicle, the passenger is directly connected to the vehicle body via the belt. In such an airbag apparatus, free movement of the body is constrained, thereby disadvantageously hindering effective airbag operation.

In order to solve such a disadvantage, it is necessary to keep the belt in a loosened state. However, in this state, if a collision occurs, the airbag apparatus is not activated until the passenger comes apart from the vehicle body to a certain distance where the belt is tensed. Therefore, resulting in delayed activation, and hence difficulty in satisfactory absorbance of the impact against the passenger. Further, the loosened belt may be caught by something or wound around something, which may cause improper operation of the airbag apparatus.

In view of such circumstances, the invention provides a novel vehicle airbag apparatus in which the above-described problems are solved.

BRIEF SUMMARY

A vehicle airbag apparatus is provided that is put on a passenger's body in advance for absorbing an impact against the passenger. The airbag apparatus includes an airbag body and an inflator for inflating and deploying the airbag body provided on a wearing member worn by the passenger; an ELR (emergency locking retractor) device provided on a vehicle body; an activation switch for connecting a free end of a connecting cable member drawn from the ELR device; and an operating portion of the inflator. When a tensile strength of a predetermined value or higher is exerted to the connecting cable member, the activation switch is activated to operate the inflator, thereby inflating and deploying the airbag body.

In one embodiment, the activation switch is detachable and is released from connection when a tensile strength of the predetermined value or higher is exerted to the connecting cable member.

In another embodiment, the ELR device is provided on a passenger seat.

According to such an airbag device, the passenger is not restricted from normal movement during normal travel of the vehicle. Further, upon a vehicle collision or the like, the airbag body is immediately inflated and deployed so that the impact against the passenger is effectively and adequately absorbed.

Since the activation switch is activated when release of connection is sensed, thereby operating the inflator, the passenger can be moved apart from the vehicle body when the airbag body is inflated and deployed, and the ELR device can reduce the length of the connecting cable member drawn out therefrom. Hence good response to a collision is achieved.

DETAILED DESCRIPTION

Referring now to examples of the present invention illustrated in the accompanied drawings, an embodiment of the present invention will be described in detail below.

In one embodiment, the airbag apparatus of the present invention is applied to a motorcycle.

Figure 1:
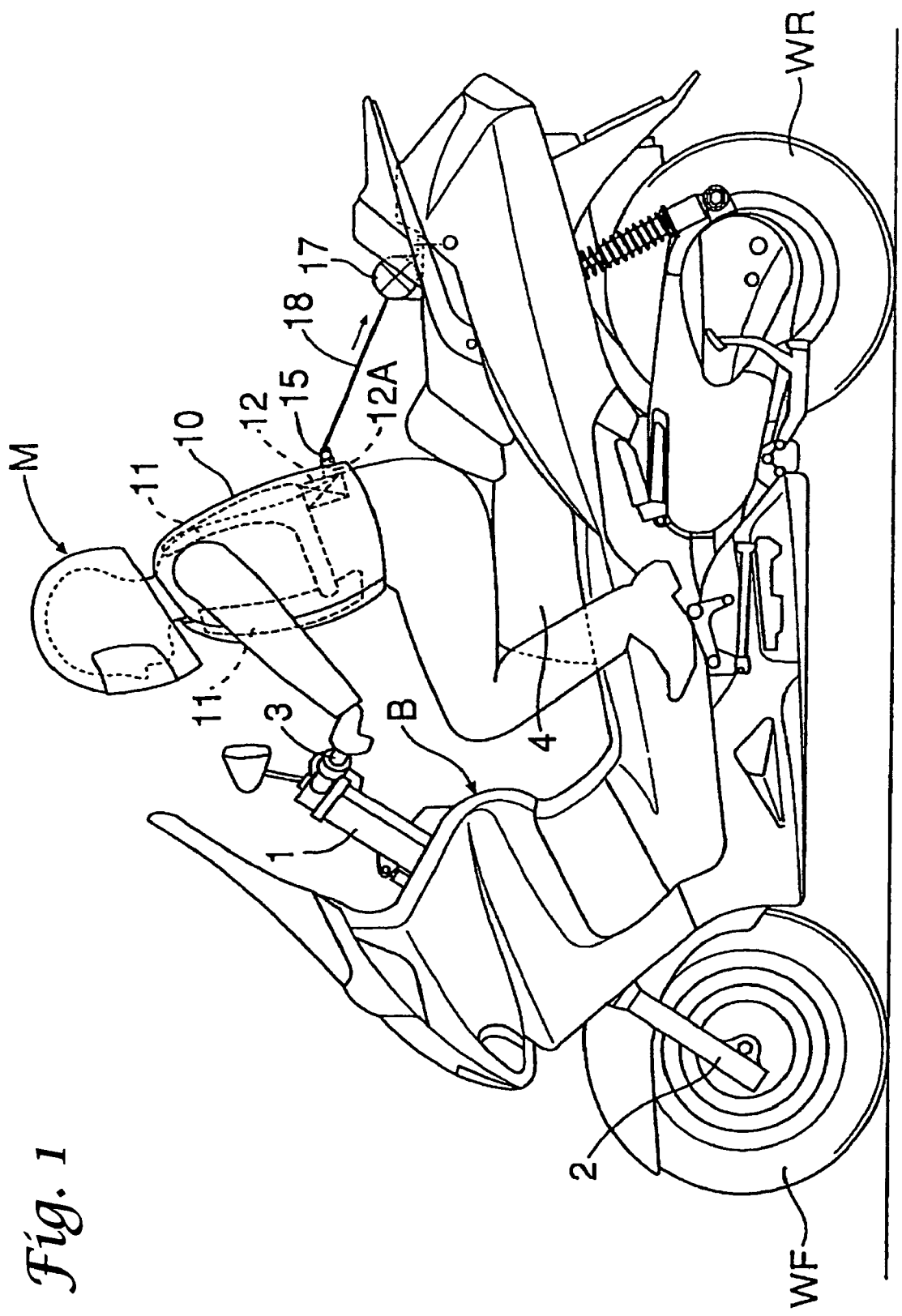
FIG. 1 is a side view of a motorcycle provided with a vehicle airbag apparatus according to the present invention.

Referring to FIG. 1, a motorcycle of saddle-riding type includes a front fork 2 having a front wheel WF journaled thereto and is steerably supported on a head pipe 1 at a front end of a vehicle body B, and a steering handle 3 is provided at an upper end of the front fork 2. A rear wheel WR, which is driven by an engine, is suspended on a rear portion of the vehicle body B. A passenger seat 4 is provided on an upper surface of the vehicle body B, at a midsection in the fore-and-aft direction.

A passenger M wearing a wearing member 10 of a wearing-type airbag apparatus, such as a vest provided with an airbag module, is seated on the passenger seat 4. The wearing member 10 is provided with an airbag body 11 which guards the upper half body of the passenger M, and an inflator 12 on a lower rear position thereof. The inflator 12 generates a pressure gas for inflating and deploying the airbag body 11 when operated. Gas-type, solid-state type, mixed gas type, or air-suction type may be used.

A connecting cable 18 connects the wearing member 10 to an ELR device 17. A free end of the connecting cable 18 is connected to an operating portion 12A of the inflator 12 via a detachable activation switch 15. The activation switch 15 is provided with a sensor for sensing a release of connection thereof, so that the inflator 12 is operated in response to the sensing and reaction of the sensor. A pretension lock device, or an ELR device (emergency locking retractor) 17, is mounted to a rear portion of the passenger seat 4. The detachable activation switch 15 is connected to the free end of the connecting cable 18 drawn from the ELR device 17.

The ELR device 17 is known in the art, and is normally provided with a pretension function for pulling the connecting cable 18 in a winding direction by a force that does not impair normal operation. The ELR includes a spring such as a power spring to prevent the connecting cable 18 from sagging, and a locking function for locking drawing of the connecting cable 18 when acceleration (relative acceleration between the passenger and the motorcycle) of the connecting cable 18 exceeds a stipulated value.

Figure 2:
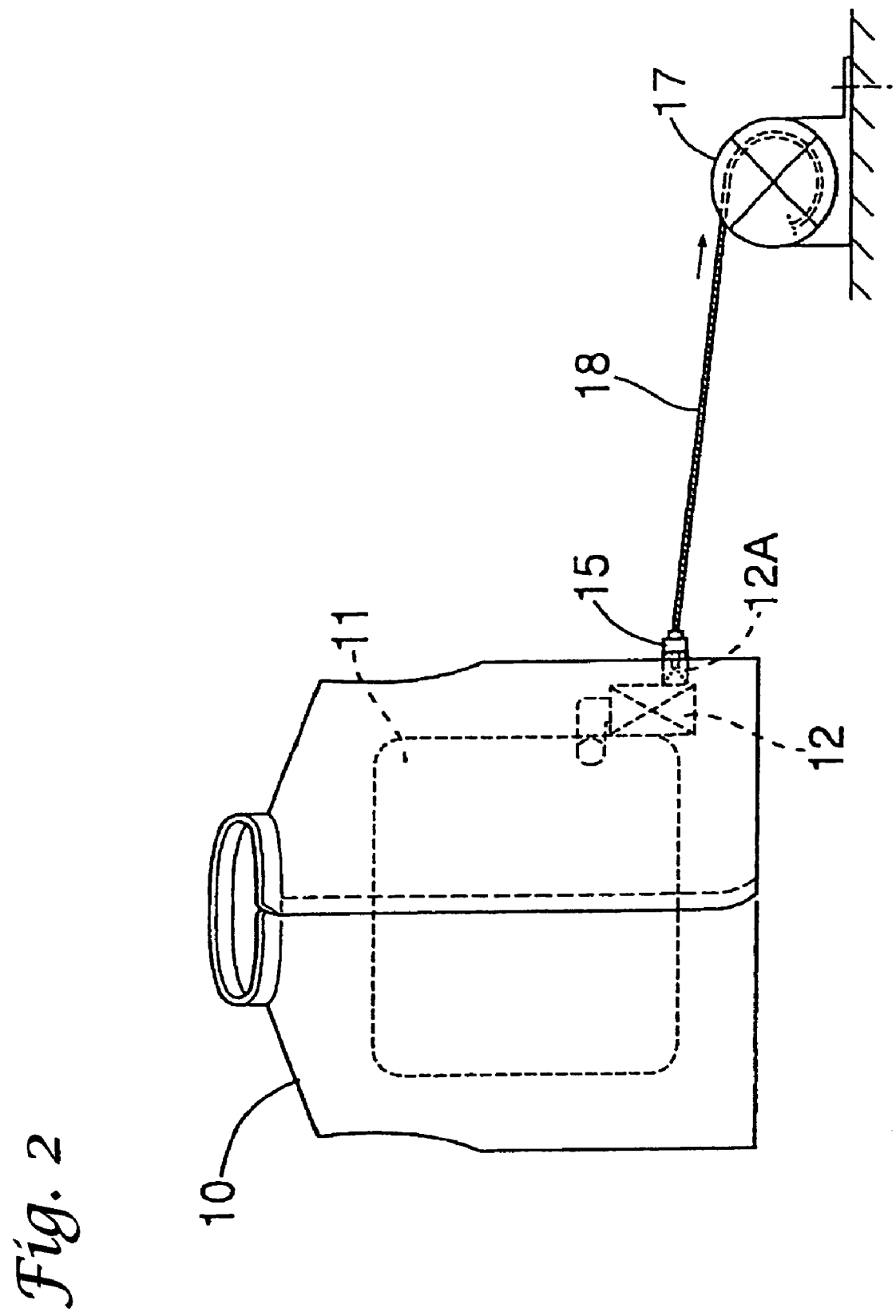
FIG. 2 is a general view of the airbag apparatus.

Referring to FIGS. 1 and 2, in advance of any collision, the passenger M puts on the wearing member 10 provided with the airbag module and including the airbag body 11 and the inflator 12. The passenger is seated on the passenger seat 4 of the motorcycle, and the operating portion 12A of the inflator 12 and the free end of the connecting cable 18 of the ELR device 17 are connected via the detachable activation switch 15. Accordingly, the inflator 12 of the wearing member 10, worn by the passenger M, and the ELR device 17, provided on the vehicle body B of the motorcycle, are connected.

The passenger M checks the connection and starts traveling with the motorcycle. During normal traveling of the motorcycle, even when the inflator 12, on the passenger M side, and the ELR device 17, on the vehicle body B side, are connected by the connecting cable 18, a tensile strength that does not hinder normal movement is exerted on the connecting cable 18 by the function of the ELR device 17. The passenger M can move his/her body freely, being substantially unaffected by the connection of the connecting cable 18. Thereby normal operation can be maintained.

When an accident such as a collision with another vehicle or obstacle is encountered during travel, the passenger M receives an abrupt force to move forwardly of the motorcycle, whereby a relative acceleration difference occurs between the passenger M and the motorcycle. As a result, if the relative acceleration difference exceeds the predetermined value, the ELR device 17 is brought into a locked state, and drawing of the connecting cable 18 is prevented.

Figure 3:
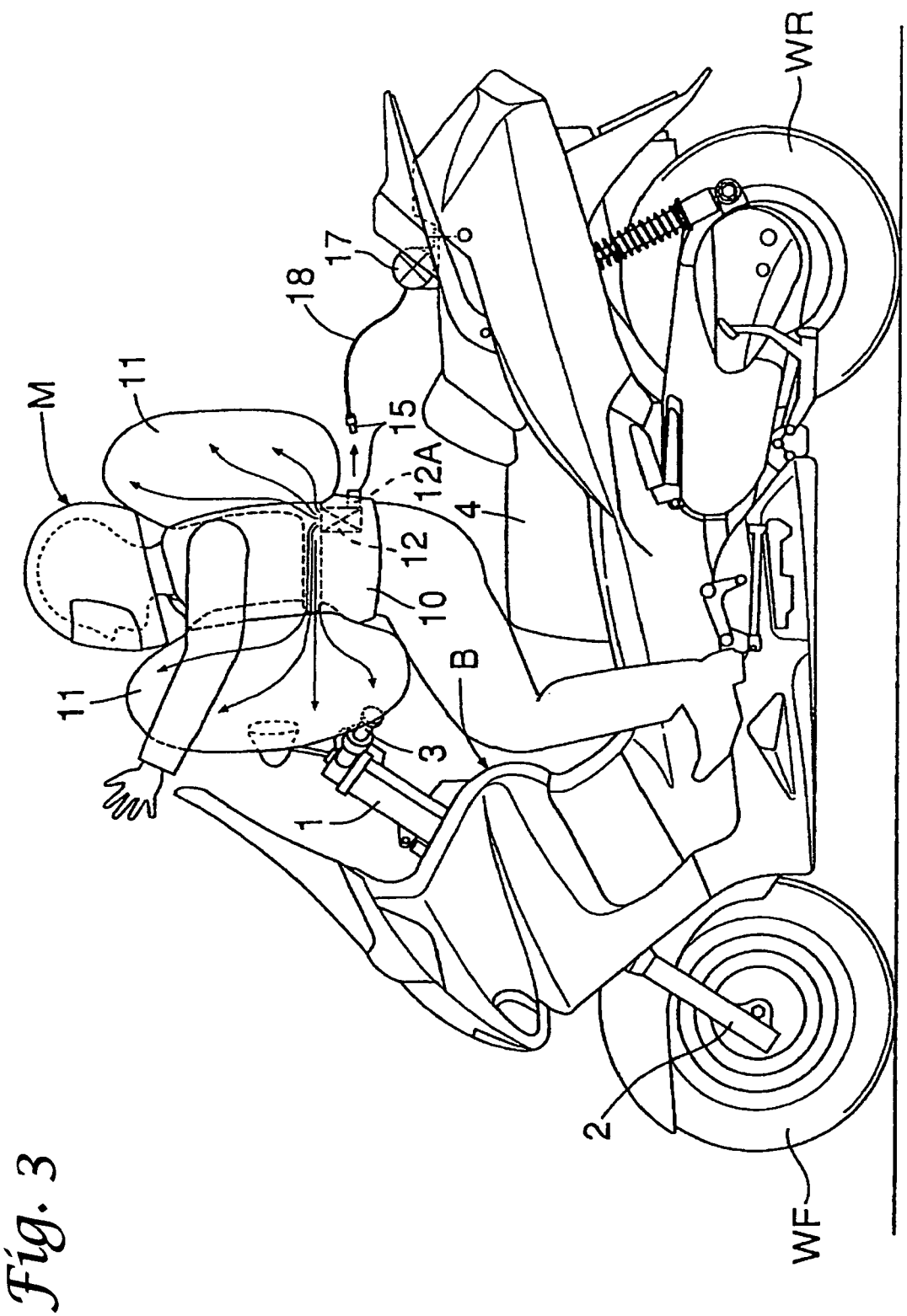
FIG. 3 is a side view of the motorcycle after the airbag apparatus has operated.

Referring to FIG. 3, the connection of the detachable activation switch 15 is forcedly released, and the connection release sensor senses this release and activates the inflator 12. Accordingly, the airbag body 12 is inflated and deployed, and the passenger M can move apart from the vehicle body B, whereby the impact against the passenger M due to the collision with the obstacle can be absorbed.

In this manner, since the connecting cable 18 can detect the relative acceleration difference between the passenger M and the motorcycle that is generated immediately after the collision from the tensed state, resulting in inflation and deployment of the airbag body 11, the time from the collision to the inflation and deployment of the airbag body 11 (and absorption of the impact against the passenger) is reduced. The ELR device 17, being mounted to the passenger seat 4, can reduce the length of the connecting cable 18 and hence good response is achieved.

Although the embodiment of the present invention has been described so far, the present invention is not limited to the described embodiment, and various embodiments are applicable within the scope of the invention.

For example, although the case in which the present invention is implemented in the motorcycle has been described, it can be implemented in other vehicles such as motortricycles as a matter of course. Also, while the activation switch employed is of a detachable type which is activated by releasing the connection, in another possible embodiment, the activation switch is activated in a connected state. While the described connecting cable is employed as the connecting cable member drawn from the ELR device, in yet another embodiment, the connecting cable comprises another member having the same effect, such as a connecting belt.

The invention claimed is:

1. A vehicle airbag apparatus that is put on a passenger's body in advance for absorbing an impact against the passenger comprising:
   a wearing member for wearing by the passenger;
   an airbag body provided on the wearing member;
   an inflator for inflating and deploying the airbag body;
   an emergency locking retractor device provided on a vehicle body;
   an activation switch;
   a connecting cable member having a first end for connecting to said activation switch and said inflator and a second end connected to said emergency locking refractor device, said emergency locking refractor device including means for winding the connecting cable member so that tension is created in the connecting cable member, and
   means for releasing the connecting cable member from the activation switch when a tensile strength of a predetermined value or greater is exerted on the connecting cable member, wherein the activation switch is activated to operate the inflator to inflate and deploy the airbag body.

2. The vehicle airbag apparatus according to claim 1, wherein the emergency locking retractor device is provided on a passenger seat.

3. A method of absorbing an impact against a passenger in a vehicle due to a vehicle collision, the method comprising:
   wearing a wearable airbag apparatus by the passenger, the wearable airbag apparatus including:
   a wearing member,
   an airbag body provided on the wearing member,
   an inflator for inflating and deploying the airbag body,
   an emergency locking retractor device provided on the vehicle body, and
   an activation switch for detachably connecting an end of a connecting cable member drawn from the emergency locking retractor device;
   checking connection of the connecting cable member to the wearing member by the passenger;
   traveling by the passenger in the vehicle;
   inflating and deploying the wearable airbag apparatus at the time of the vehicle collision, the wearable airbag apparatus automatically performing the steps of:
   detecting a relative acceleration difference between a velocity of the passenger and a velocity of the vehicle by the connecting cable member;
   then releasing by the activation switch the detachable connection of the connecting cable member to the emergency locking refractor device;
   next sensing the releasing by a release sensor;
   followed by activating the inflator;
   then inflating the inflator; and
   finally absorbing impact on the passenger.

* * * * *